Oct. 13, 1942.  R. C. RUSSELL  2,298,648
HYDRAULIC TRANSMISSION
Filed Feb. 20, 1940  4 Sheets-Sheet 3
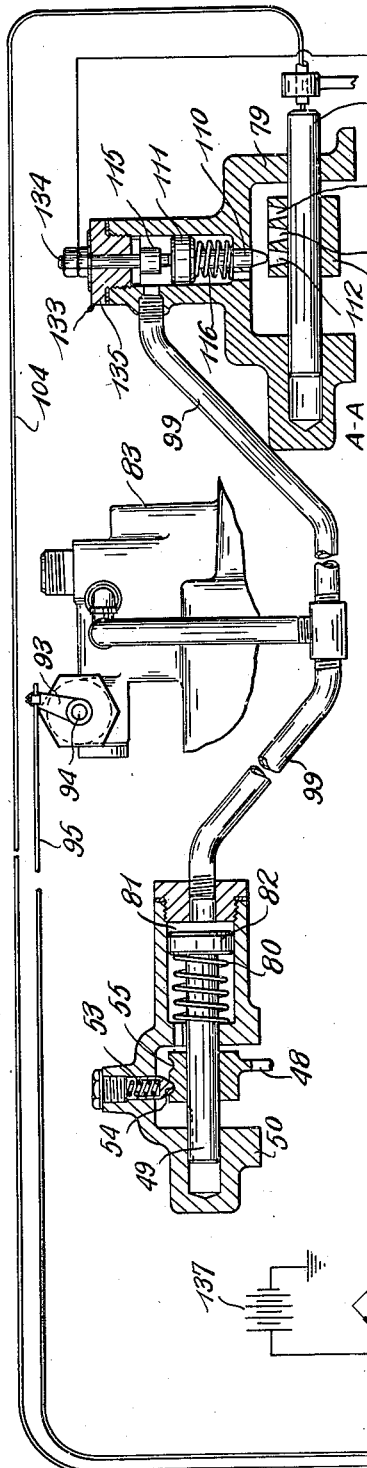
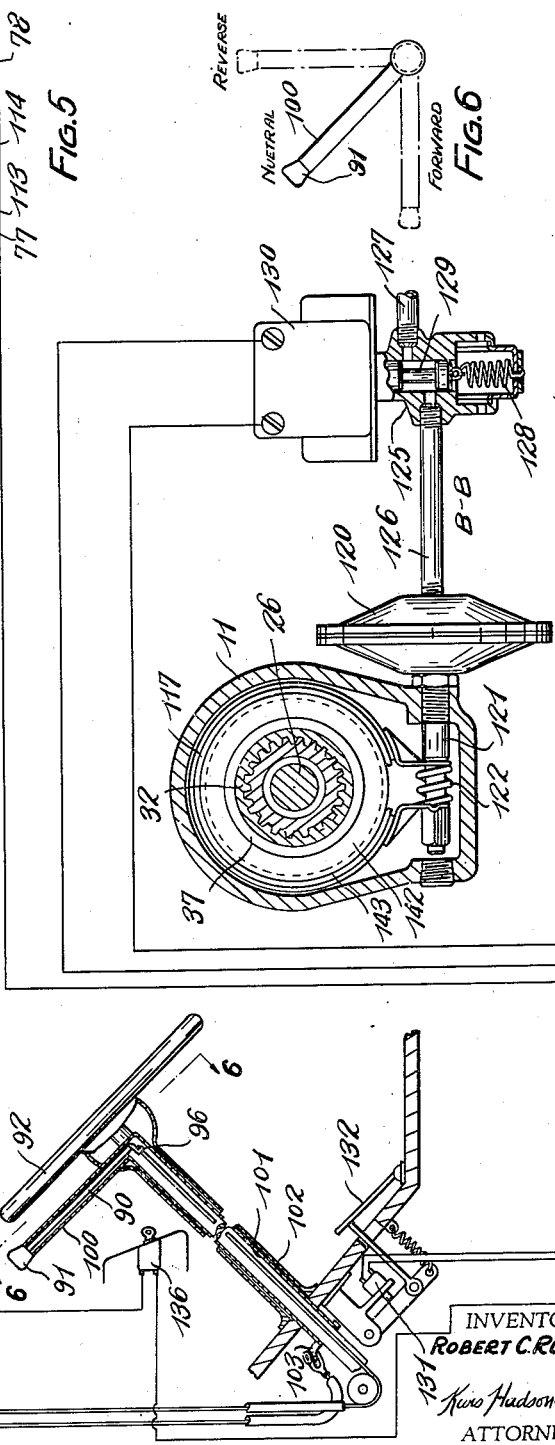
INVENTOR.
ROBERT C. RUSSELL
Kurs Hudsone Kent
ATTORNEYS Oct. 13, 1942.   R. C. RUSSELL   2,298,648
HYDRAULIC TRANSMISSION
Filed Feb. 20, 1940   4 Sheets-Sheet 4

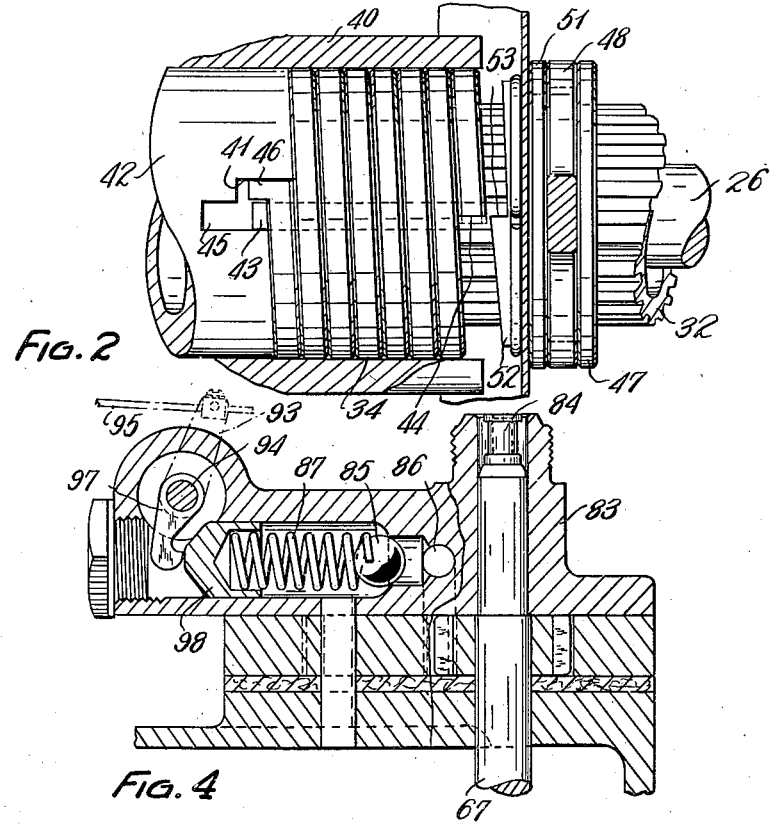
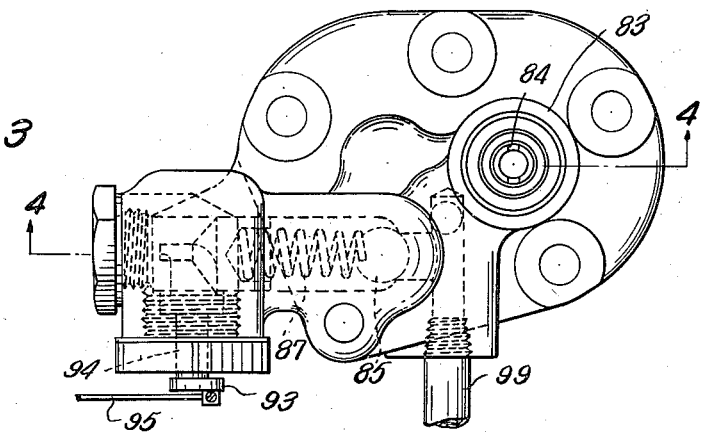

INVENTOR.
ROBERT C. RUSSELL
BY   Kwis Hudson & Kent
ATTORNEYS

Patented Oct. 13, 1942

2,298,648

UNITED STATES PATENT OFFICE 2,298,648

HYDRAULIC TRANSMISSION

Robert C. Russell, Cleveland, Ohio

Application February 20, 1940, Serial No. 319,926

39 Claims. (Cl. 74—189.5)

The present invention relates to power transmitting apparatus comprising an impeller wheel or centrifugal pump by virtue of which a liquid medium such as water, oil or the like is thrown and forced against a turbine wheel or rotor and a driven member rotated thereby, and more particularly to improvements in power transmitting apparatus of this character especially adapted for use in connection with motor-driven vehicles.

One of the principal objects of the present invention is the provision of a novel hydraulic power transmitting apparatus comprising three relatively rotatable vane members adapted to be operated either as a fluid torque converter or as a fluid coupling and including means for connecting the vane member or wheel which constitutes the reaction member when the transmission is operated as a fluid torque converter with either the driving member or the driven member when the transmission is operated as a fluid coupling.

Another object of the invention is the provision of a novel hydraulic power transmitting apparatus comprising a turbine wheel having a plurality of radially spaced series of vanes interposed between a plurality of vane wheels or rotors.

Another object of the present invention is the provision of a novel power transmitting apparatus comprising a hydraulic power transmission adapted to be operated either as a fluid coupling or as a fluid torque converter combined with torque amplifying gearing, so constructed and arranged that when the hydraulic transmission is operated as a fluid torque converter, the torque amplifying gearing is in series therewith, and when operated as a fluid coupling, the speed reduction between the driving and driven members of the transmission proper automatically approaches a one-to-one ratio as the speed of the turbine wheel or rotor approaches that of the impeller wheel or wheels.

Another object of the invention is the provision of a novel power transmitting apparatus of the character referred to especially adapted for use in motor-driven vehicles and comprising means for automatically preventing the rotation of the driven member or members when the vehicle is at rest with the motor idling.

Another object of the invention is the provision of a novel power transmitting apparatus of the character referred to especially adapted for use in motor-driven vehicles and comprising means for rotating the driving member from the driven member when the speed of the driven member exceeds that of the driving member without forming a direct drive between said members when the speed of the driving member exceeds that of the driven member, thus making it possible to employ the motor of the vehicle to decelerate the same, without otherwise interfering with the normal operation of the transmission.

Another object of the invention is the provision of a novel hydraulic power transmitting apparatus adapted to be operated either as a fluid coupling or as a fluid torque converter especially adapted for use in motor-driven vehicles combined with means for automatically changing the hydraulic transmission from one form to the other at a predetermined speed of one of the members of the transmission or of the vehicle, either alone or in combination with means adapted to be manually controlled by the operator of the vehicle for varying the speed at which the change takes place.

The present invention resides in certain details of construction and combinations and arrangements of parts and further objects and advantages thereof will be apparent to those skilled in the art to which the invention relates from the following description of the preferred embodiment thereof described with reference to the accompanying drawings forming a part of this specification in which similar reference characters designate corresponding parts and in which:

Fig. 2 is a detail view approximately on the line 2—2 of Fig. 1;

Fig. 3 is an elevation of a portion of the transmission shown in Fig. 1;

Fig. 4 is a section approximately on the line 4—4 of Fig. 3;

Fig. 5 is a diagrammatic view of the control apparatus for the power transmitting apparatus, with portions shown in section, some approximately on the vertical center line of the transmission and others on the lines A—A and B—B of Fig. 1;

Fig. 6 is a section approximately on the line 6—6 of Fig. 5; and

Figure 1:
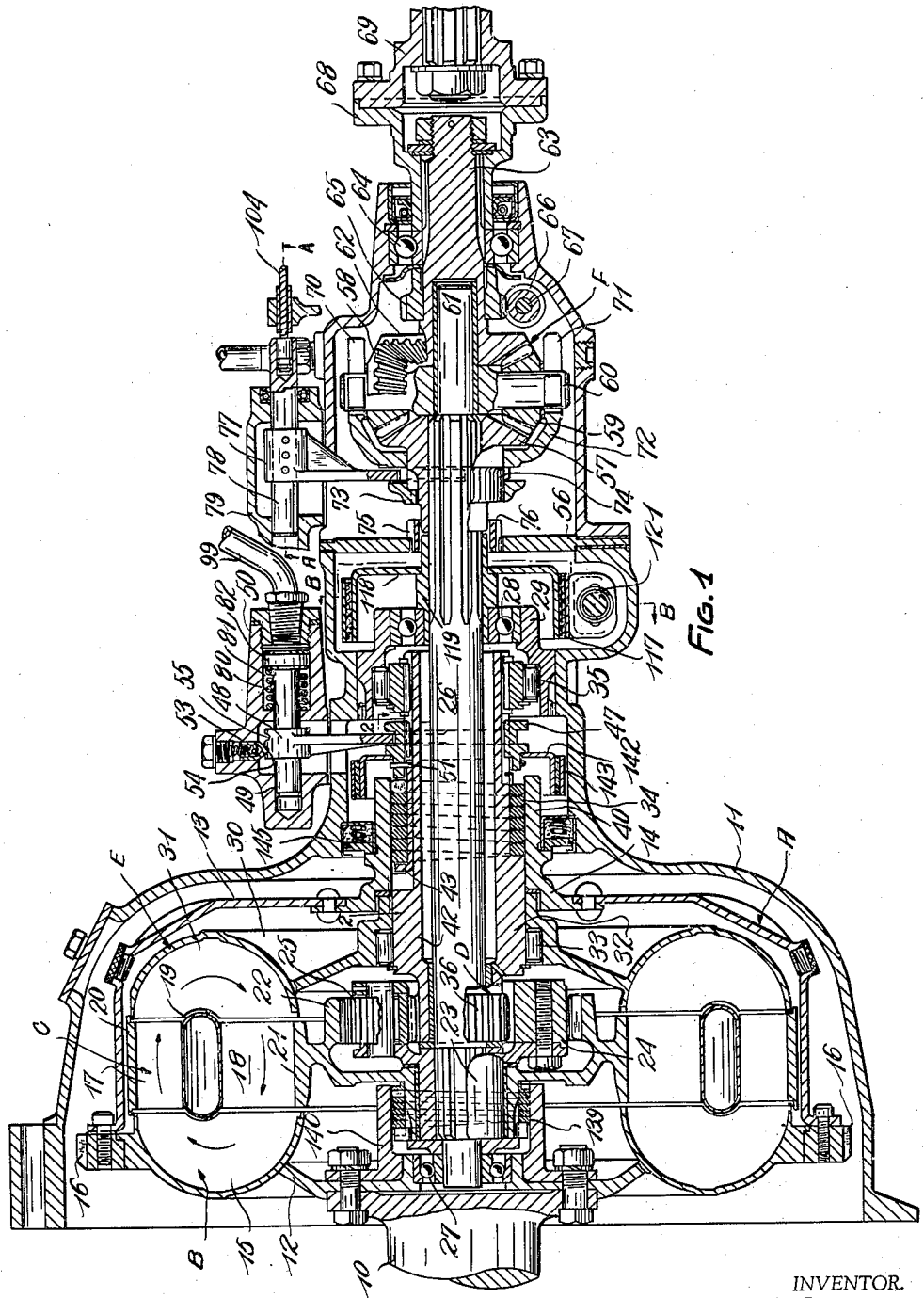
Fig. 1 is a vertical section through a power transmission embodying the present invention.

Referring to Fig. 1 of the drawings, the reference character 10 designates a crank shaft of an internal combustion engine of a motor-driven vehicle. The reference character 11 designates a transmission case adapted to be bolted or otherwise suitably secured to the rear part of the engine proper (not shown). To the rear end of the crank shaft 10 is bolted a casing, designated generally by the reference character A, and comprising a plurality of members 12, 13, and 14, suitably fixed together, the former of which is directly connected with the crank shaft 10 and has a semi-circular groove adjacent the periphery thereof within which groove a series of vanes 15 are secured. The member 12 together with the vanes 15 constitutes the impeller wheel or centrifugal pump, designated generally as B, of the hydraulic transmission. The element B is sometimes referred to in the art as the primary element of the fluid transmission. The member 12 has gear teeth 16 formed on the periphery thereof, which gear teeth are adapted to cooperate with the pinion of a conventional starting device for the motor.

The turbine wheel or rotor of the fluid coupling, sometimes called the secondary member, is designated generally by the reference character C and comprises two series of vanes 17 and 18 located radially of each other and separated by a ring-shaped tubular member 19 against which the adjacent ends of the respective vanes abut and to which they are preferably also attached. The radially outer ends of the vanes 17 are connected to an annular member 20 and the radially inner ends of the vanes 18 are connected to an annular member 21 having an internal orbit gear 22 of a planetary gear train, designated generally by the reference character D, formed integrally therewith. The annular member 21 is rotatably supported on the hub 23 of the spider member 24 which carries the planet gears 25 of the planetary gear train D. The spider member 24 is splined to the left-hand end of a driven shaft 26, rotatably supported by bearings 27 and 28 in a hub formed integral with the member 12 and an annular member 29 non-rotatably fixed within the transmission case 11.

The third element or vane wheel of the hydraulic transmission, designated generally by the reference character E, comprises a member 30 somewhat similar in shape to the member 12 previously referred to and like the member 12 has a semi-circular annular groove adjacent to the periphery thereof within which a series of vanes 31 are secured in a suitable manner. When the hydraulic transmission is operated as a fluid torque converter, the member E remains stationary and constitutes the reaction member of the fluid torque converter and when the hydraulic transmission is operated as a fluid coupling, the member E is connected to the casing A and together with the member B forms the impeller wheel or primary element of the fluid coupling. The member E is rotatably supported on a tubular member or shaft 32 for rotation in a forward direction while being held against reverse rotation by an overrunning roller clutch 33. The clutch 33 permits rotation of the vane wheel E relative to the tubular shaft 32 in a forward direction, which as shown, is in a clockwise direction when viewed from the left in Fig. 1, but prevents relative rotation between the two members in a reverse direction.

The tubular member or shaft 32 is in turn rotatably supported in the member 14 of the casing A and the transmission case 11 by means including a coil-type, overrunning clutch 34 and a roller-type, overrunning brake 35, respectively. The sun gear 36 of the planetary gear train D is formed on the left-hand end of the tubular member or shaft 32, as viewed in Fig. 1. When the hydraulic transmission is operating as a fluid torque converter, the overrunning roller brake 35 prevents reverse rotation of the sun gear 36 under the reaction produced by the planet gears 25 which are then being driven by the orbit gear 22 through the turbine wheel C, and also prevents backward rotation of the tubular shaft 32 under the influence of the member E due to the fluid reaction, while permitting the tubular shaft 32 and in turn the vane wheel E and the sun gear 36 to be carried forward by the casing A when the selective type overrunning clutch 34 is engaged in both directions, as is hereinafter described, and the hydraulic transmission is operating as a fluid coupling.

As is well known in the art, the fluid passing from the turbine wheel or rotor to the reaction member of a fluid torque converter of the character here involved tends to drive the reaction member forward as the speed of the turbine wheel approaches that of the impeller wheel. In the present transmission, when these circumstances occur, the overrunning clutch 33 allows the member E to rotate forwardly, thus producing torque increase through the planetary gear train only and without fluid drag thereby increasing the efficiency of the device while operating as a fluid torque converter.

The member 14 of the casing A includes an elongated hub 40 rotatably supported on the tubular member or shaft 32 and adapted to be locked to the tubular shaft 32 against rotation in either direction by the selective-type overrunning clutch 34, the left-hand end of which is normally prevented from rotation in a counterclockwise direction, as viewed from the left in Figs. 1 and 2 by a shoulder 41 formed by the enlarged portion 42 of the tubular shaft 32 to the left of the clutch 34 and is adapted to be selectively held against rotation in the opposite direction by an outwardly projecting end 43 of a member 44 slidably supported in a longitudinal keyway 45 in the tubular shaft 32. The projection 43 on the member 44 is adapted to be selectively positioned in front of the axially extending projection 46 on the left-hand end of the coil member of the clutch 34. The member 44 is adapted to be moved to position the projection 43 either in front of the projecting part 46 of the coil 46 or clear thereof by a collar member 47 keyed to the tubular shaft 32, which collar member 47 is in turn adapted to be shifted to the right or left, as viewed in Figs. 1 and 2, by a yoke member 48 fixed to a shaft 49 slidably supported in a housing 50 bolted or otherwise secured to the transmission case 11. The yoke member 48 and in turn the members 44, 47 and 49, etc., are adapted to be moved from one to the other of the aforesaid two positions in a manner hereinafter explained, and are held in one or the other of said positions against accidental displacement by a spring-pressed detent 53 which engages in one or the other of two apertures 54 and 55 in the hub of the member 48. In the embodiment shown, the collar member 47 is connected to the member 44 by an annular spring 51, one end of which engages in a suitable aligned aperture formed in the right-hand end of the member 44 and a flange 52 on the yoke member 47. The flange 52 on the yoke member 47 is formed to provide a shoulder or abutment 53 adapted to be positioned in front of the right-hand end of the coil member 34 when the projection 43 of the member 44 is shifted to a position where it is clear of the projection 46 of the coil member 34.

The construction is such that when the member 44 is shifted to the right, the casing A can overrun the tubular shaft or member 32, in which event the hydraulic transmission operates as a fluid torque converter, and when the member 44 is shifted to the left, the casing A and the tubular shaft 32 are fixed or locked together as a single unit and the vane wheel E and the sun gear 36 are directly driven along with the impeller wheel B from the crank shaft 10, in which event the hydraulic transmission operates as a fluid coupling. However, the driven shaft 26 is not directly connected to the driving shaft 10 since the orbit gear 22 which forms the reaction member for the planet gears 25 when the hydraulic transmission is operated as a fluid coupling is connected to the turbine wheel C.

The right-hand end of the driven shaft 26 projects through a partition 56 fixed between two parts of the transmission case 11. To the right of the partition 56, the driven shaft 26 carries a bevel side gear 57 splined thereto which forms a part of a differential gearing, designated generally as F, which gearing provides a reverse drive for the vehicle. The bevel side gear 57 is continuously in mesh with a pair of bevel pinions 58 and 59 rotatably supported on a spider member 60 which in turn is rotatably supported on a reduced end 61 of the driven shaft 26. The bevel pinions 58 and 59 are continuously in mesh with a second bevel side gear 62 rotatably supported on the reduced end 61 of the driven shaft 26 and having an elongated hub 63 rotatably supported in the transmission case 11 by an anti-friction bearing 64. The hub 63 of the bevel side gear carries a worm wheel 65 in mesh with a worm 66 fixed on a shaft 67, hereinafter referred to, and has one-half of a coupling member 68 splined thereto through the medium of which the hub 63 is connected to a driven shaft 69, which preferably is the propeller shaft of the motor-driven vehicle but which may be a shaft leading to a change speed transmission or other mechanism which one may wish to interpose between the present transmission and the rear axle of the vehicle.

Opposite ends of the spider member 60 upon which the bevel pinions 58 and 59 are rotatably supported project beyond the pinions and into elongated slots 70 and 71 in a yoke member 72 rotatably and slidably supported on the hub of the bevel side gear 57. The yoke member 72 is provided with internal gear teeth 73 adapted to be in mesh with similar teeth 74 on the hub of the bevel side gear 57, with teeth 75 formed on the member 76 fixed in the partition 56, or positioned intermediate the teeth 74 and 75 and out of engagement with either of said sets of teeth. When the teeth 73 of the yoke member 72 are meshed with the teeth 74 of the bevel side gear 57, the differential mechanism F comprising the bevel side gears 57 and 62 and the bevel pinions 58 and 59 operates as a unit, with the result that a direct drive is effected between the shaft 26 and the shaft 69. When the teeth 73 of the yoke member 72 are meshed with the teeth 75 of the member 76, the spider member 60 of the differential gearing is held stationary with the result that the shaft 69 is rotated at the same speed as the shaft 26 but in a reverse direction. When the yoke member 72 is so positioned that the teeth 73 thereof are in a neutral position, that is, disengaged from both the teeth 74 of the side bevel gear 57 and the teeth 75 of the member 76, the yoke member 72 and the spider member 60 can rotate freely and the drive between the shaft 26 and the shaft 69 is interrupted. The yoke member 72 is adapted to be shifted into either of the three aforesaid positions by a shifting arm or member 77 fixed to a shaft 78 slidably supported in a housing 79 attached to the transmission case 11. The aforesaid mechanism provides means for obtaining a reverse drive for the motor-driven vehicle. The shaft 78 and in turn the member 72 may be moved from one operating position to another by any suitable mechanism. The preferred mechanism will be hereinafter fully described.

According to the provisions of the present invention, means is provided for automatically shifting the shaft 49 and in turn the members 44 and 47 when the vehicle reaches a predetermined speed changing the fluid transmission from a fluid torque converter to a fluid coupling in the event the vehicle is being accelerated and vice versa when the vehicle is being decelerated. The present invention also contemplates manual means under the control of the operator for varying the speed at which the shift or change takes place. As shown, the shaft 49 is continuously urged towards the right, as viewed in Figs. 1 and 5, by a compression spring 80 located in a cylindrical bore 81 in the housing 50 and is adapted to be moved towards the left by a fluid-actuated piston 82 fixed to the right-hand end thereof.

Fluid pressure for operating the piston 82 is adapted to be supplied by a small constant volume gear-type oil pump 83 (see Fig. 4), the operating shaft 67 of which carries the worm 66 previously referred to. The outer end of the shaft 67 has a coupling 84 formed thereon, to which the speedometer shaft of the vehicle is adapted to be connected. The oil pump 83 has a spring-loaded by-pass valve 85 connected to the pressure conduit 86 adapted to by-pass a portion of the fluid to the sump. The fluid pressure existing in the conduit 86 at any time is determined by the speed of the pump and the pressure of the spring 87 which continuously urges the valve 85 towards its seat. The force of the spring 87 on the valve 85 can be regulated by the operator of the vehicle by a shaft 90 provided with a hand knob 91 located underneath the steering wheel 92 of the motor-driven vehicle and connected to an arm 93 fixed to a shaft 94 rotatably supported in the housing of the pump 83 through the medium of a Bowden wire 95, one end of which is connected to a crank 96 on the end of the shaft 90 opposite the hand knob 91 while the other end thereof is connected to the arm 93. A lever 97 fixed to the shaft 94 within the pump housing engages the left-hand end of a plunger 98 against which the spring 87 abuts.

The pressure conduit 86 of the pump 83 is connected to the cylinder 81 within which the piston 82 reciprocates by a conduit 99. As previously stated, pressure in the conduit 86 is a function of the speed of the pump and the proportion of the fluid by-passed by the valve 85. In view of the fact that the pump 83 is driven from the worm wheel 65, which is in turn operatively connected to the road wheels of the vehicle, the volume of oil pumped is a function of the speed of the vehicle. The construction is such that the regulating valve 85 can be manually set so that sufficient pressure in the conduit 99 to overcome the resistance of the spring 80 occurs at or above any desired speed of the vehicle, thereby determining or varying the speed at which the fluid transmission is shifted or changed from a fluid torque converter to a fluid coupling or vice versa. When the fluid transmission is operating as a fluid torque converter, the casing A is overrunning the coil-type overrunning clutch 34, the projection 46 engages the projection 43 and the opposite end of the coil member moves into the position shown in dot-dash lines in Fig. 2, thus preventing the members 44, 47, 48, 49, etc. from shifting even though the pressure in the conduit 99 is sufficient to overcome the force of the spring 80 until the driving torque is released, at least momentarily, as by the operator momentarily releasing the accelerator pedal. The reverse operation or shifting of the members 44 etc. under the action of the spring 80 when the pressure in the conduit 99 falls to a point where it is no longer sufficient to overcome the force of the spring is prevented by the pressure or friction between the right-hand end of the coil member 34 and the abutment 53 on the member 47, which pressure or friction is considerable since the sun gear 36 is then being driven from the casing A through the clutch 34. When the driving torque is released momentarily the load is removed from the sun gear and the members 44 etc. permitted to shift.

The shaft 78 which controls the differential reverse gearing F is adapted to be shifted longitudinally by a lever 100 coaxial with the shaft 90 and within which the shaft 90 is rotatably supported. The lever 100 is fixed to the upper end of a tubular shaft 101 coaxially mounted with the steering shaft 102 of the motor-driven vehicle. The lower end of the tubular shaft 101 carries a lever 103 to which one end of a Bowden wire 104 is connected while the other end thereof is connected to the right-hand end of the shaft 78.

With a reverse gear mechanism of the character here described, it is difficult, if not impractical, to engage either the forward drive or the reverse drive while the vehicle is in motion without "clash." In order to prevent one from shifting the yoke member 77 of the reverse differential gearing F from either of its three operating positions into another position while the vehicle is moving, a plunger 110 fixed to a piston 111 and slidably supported in the housing 79 is adapted to be projected into one of three apertures 112, 113 and 114 formed in the hub of the operating arm 77 when the pressure in the conduit 99 exceeds a certain amount, which conduit in addition to communicating with the cylinder 81, communicates with the cylinder 115 within which the piston 111 is located. The piston 111 and in turn the plunger 110 is continuously urged in a direction to disengage the plunger from the apertures 112, 113 and 114 by a light compression spring 116 interposed between the piston 111 and the bottom wall of the cylinder 115 in the housing 79 within which cylinder the piston reciprocates. The size of the piston 111 and the strength of the spring 116 are preferably so selected that the piston 111 is moved against the resistance of the spring when the vehicle is traveling, even though the speed of the vehicle may be as low as two to five miles per hour. The mechanism just described prevents the yoke member 77 from being shifted while the vehicle is traveling.

In hydraulic power transmission of the character herein referred to, there is always a small amount of drag on the turbine wheel while the engine is idling. This drag may or may not be sufficient to cause the vehicle to creep forwardly or backwardly, as the case may be, when standing on a level surface with the usual brakes of the vehicle released, depending upon the idling speed of the motor and the amount of friction in the various parts of the vehicle, etc. In order to avoid any possibility of the vehicle moving due to the drag on the turbine wheel C under circumstances similar to those mentioned, the preferred embodiment of the present invention is provided with a brake 117 adapted to be applied, when the vehicle is standing with the motor idling, to a brake drum 118 welded to a member 119 splined to the driven shaft 26. As shown, the brake 117 is adapted to be operated by a vacuum motor 120 fixed to the transmission case 11 and operatively connected to the brake 117 by a shaft 121. The brake 117 is continuously urged in a direction to disengage the brake drum 118 by a compression spring 122 interposed between adjacent ends of the brake proper. The brake 117 includes the usual brake lining. The vacuum motor 120 is adapted to be connected to the intake manifold of the motor to apply the brake 117 or to atmosphere to release the brake by a three-way solenoid-operated valve 125. The vacuum motor 120 is connected to the three-way valve 125 by a conduit 126 and the three-way valve to the intake manifold of the motor by a conduit 127. The three-way valve 125 is continuously urged in a direction to connect the vacuum motor 120 with the atmosphere by a tension spring 128 connected to the plunger 129 of the valve and to the valve housing. The plunger 129 is adapted to be moved to the other position, that is, to the position where the vacuum motor 120 is connected to the intake manifold of the automobile and apply the brake by an operating solenoid 130. The operating solenoid 130 of the valve 125 is connected in series with a normally closed plunger-type switch 131 so associated with the accelerator pedal mechanism, designated generally by the numeral 132, of the automobile that the switch is open at all times except when the accelerator pedal is in fully released position.

The operating circuit for the solenoid 130 of the valve 125 is also connected in series with a switch, designated generally by the reference character 133, and comprising a member 134 fixed in an insulating bushing 135 threaded into the upper end of the cylinder 115 within which cylinder the piston 111 reciprocates. The piston 111 or at least a part thereof is a conductor of electric current and the circuit from the rod 134 is completed to ground when the piston 111 is in the position to which it is continuously urged by the spring 116 but is open when the piston is moved away from the rod 134 by pressure from the conduit 99.

From the foregoing description, it will be apparent that with the vehicle standing and the engine idling, the circuit to the operating solenoid 130 of the valve 125 will be closed and the brake 117 applied to hold the driven shaft 26 against rotation and permit clash-free gear shifting, or in case the drive is established through the differential gear train F, to hold the vehicle from creeping. The instant the accelerator pedal is depressed to start the vehicle, the accelerator switch 131 is opened, which in turn opens the circuit to the solenoid 130 and releases the brake 117 even before the vehicle has started to move. While the vehicle is moving, the application of the brake 117 is prevented by the fact that fluid pressure established in the conduit 99 maintains the switch 133 open. The operating circuit for the solenoid 130 is also connected in series with the ignition switch 136 of the automobile so that the circuit will be open when the engine is stopped, otherwise there would be an unnecessary drain on the battery 137 of the automobile.

As herein disclosed, the preferred embodiment of the invention also includes means for establishing a positive drive between the driven shaft 26 and the crank shaft 10 when the speed of the driven shaft exceeds that of the crank shaft, thus enabling the compression of the engine to be utilized in decelerating the vehicle under all circumstances, and independent of the hydraulic transmission. Unless means is provided for establishing a direct drive between the driven shaft and the crank shaft of the motor, the compression of the engine cannot be as effectively used to decelerate the vehicle because the drive is through the hydraulic transmission, which would not be very effective especially for slow speeds of the driven shaft. As shown, the mechanism for establishing a positive drive between the driven shaft 26 and the crank shaft 10 when the speed of the driven shaft is in excess of that of the crank shaft, comprises a coil-type overrunning clutch 139 interposed between the hub 23 of the member 21 and a cylindrical member 140 bolted along with the member 12 to the end of the crank shaft 10. The overrunning clutch 139 does not interfere with the forward rotation of the member C but prevents reverse rotation thereof relative to the crank shaft 10.

With the present construction, the sun gear can never overrun the housing A from which it follows that when there is a tendency for the tubular shaft 32 to be driven at a higher speed than the crank shaft 10, a direct connection is effected between the two shafts. By holding the sun gear stationary and allowing the housing A to overrun the same the speed ratio of the planetary gear train D can be taken advantage of and the crank shaft 10 caused to rotate at a higher speed than the shaft 26. With the particlar construction shown, the ratio is approximately one-to-one and four-tenths and a small brake drum 142 keyed to the member 47 and to which a brake band 143 is adapted to be applied in any convenient manner provides means for selectively holding the sun gear 36 of the planetary gear train D stationary. The construction is such that when the shaft 26 is driving the crank shaft 10 and the brake band 143 is applied to the brake drum 142, rotation of the sun gear is prevented with the result that the crank shaft 10 is driven at a higher speed than the shaft 26. In the embodiment shown, the crank shaft would be driven approximately one and four-tenths times as fast as the shaft 26. Operating in this manner is in effect similar to shifting a present-day automobile transmission into second gear while descending a hill. However, it is to be understood that the planetary gear train D may be constructed to give other speed ratios.

The casing A is either partly or wholly filled with a suitable fluid as is well known in the art, and when the hydraulic transmission is operated as a fluid torque converter, the fluid is circulated from the vanes 15 of the impeller wheel B through the vanes 17 of the turbine wheel C. From the vanes 17 of the turbine wheel C the fluid enters the vanes 31 of the member E where its direction of movement is changed, after which it flows out at the exit ends of the vanes 31 to the vanes 18 of the turbine wheel C. From the vanes 18 it returns to the radially inward ends of the vanes 15 of the impeller wheel B. The direction in which the fluid is circulated is indicated by arrows in Fig. 1. A suitable oil retainer 145 located in the transmission case 11 to the left of the brake 143 prevents oil from entering that part of the transmission case 11 which encloses the brakes 117 and 143. That portion of the transmission case 11 which houses the differential gear train F is partly filled with a suitable lubricating medium.

Figure 7:
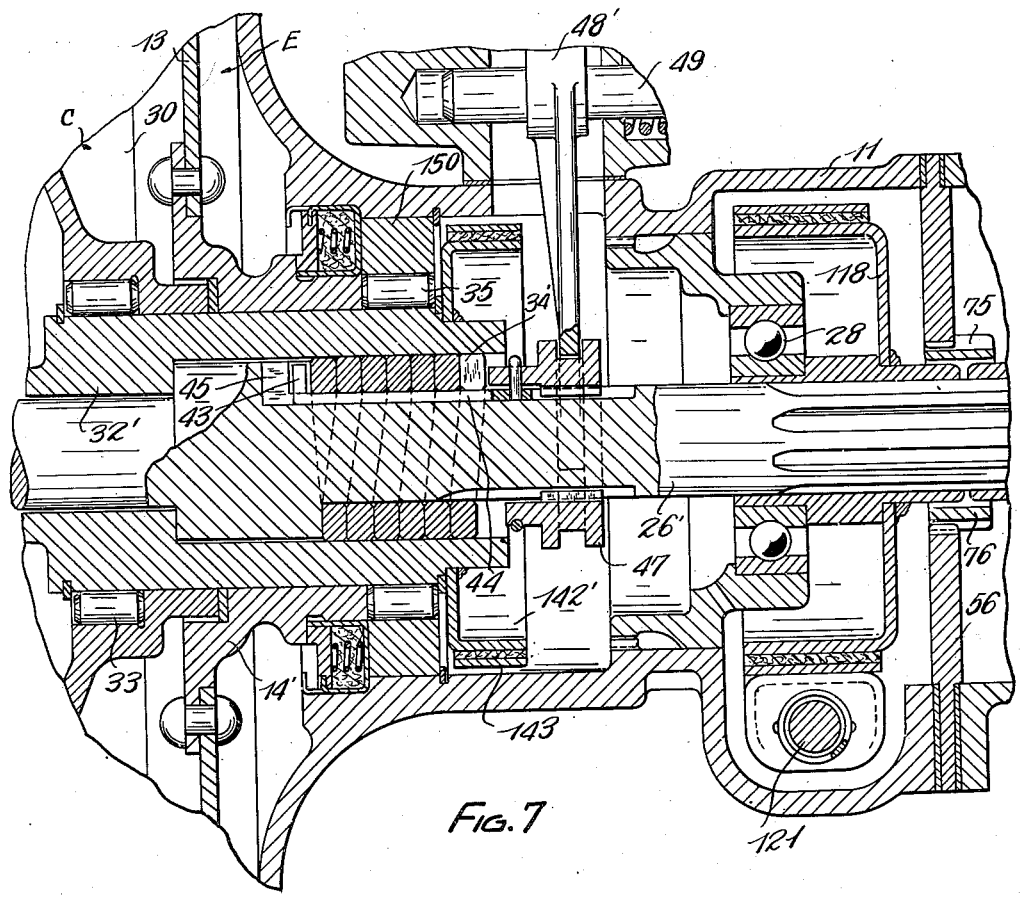
Fig. 7 is a vertical sectional view through a power transmission similar to that shown in Fig. 1 but of modified construction.

As previously stated, the vane wheel which forms the reaction member when the hydraulic transmission is operating as a fluid torque converter, may be connected to either the driving or the driven member when the hydraulic transmission is operating as a fluid coupling. Preferably the member is connected to the driving member as shown in Fig. 1. A modified construction embodying the alternative arrangement is shown in Fig. 7 which is a portion of a novel power transmitting apparatus similar to that shown in Fig. 1 except that the vane wheel which constitutes the reaction member when the hydraulic power transmission is operating as a fluid torque converter is connected to the driven member or when the hydraulic power transmission is operating as a fluid coupling. In Fig. 7 duplicate parts are designated by the same reference characters and the corresponding but slightly modified parts are designated by the same reference character with a prime mark affixed thereto.

Referring to Fig. 7, it will be observed that the coil-type overrunning clutch 34' which corresponds to the coil-type overrunning clutch 34 of the embodiment shown in Fig. 1 is interposed between the tubular shaft 32' and the driven shaft 26'. The overrunning brake 35 has been moved to a position between an exterior surface of the tubular shaft 32' and a ring-shaped member 150 fixed to the transmission case 11, and the brake drum 142' which corresponds with the brake drum 142 in the embodiment of the invention shown in Fig. 1 is fixed to the tubular shaft 32'. The operation of the coil-type overrunning clutch 34' and the roller-type overrunning brake 35 is the same in the modification shown in Fig. 7 as the corresponding elements in the preferred embodiment shown in Fig. 1. Aside from the changes noted and other minor detail changes in construction which will be apparent from the drawings, the power transmission shown in Fig. 7 is the same and is adapted to be operated and controlled in the same manner as the power transmission shown in Figs. 1 to 6, inclusive.

From the foregoing description of the preferred embodiments of the invention, it will be apparent that the objects heretofore enumerated and others have been accomplished, that a novel hydraulic power transmitting apparatus has been provided, and that there has also been provided a novel power transmitting mechanism, including hydraulic power transmitting means adapted to be operated either as a fluid coupling or as a fluid torque converter, combined with amplifying gearing so constructed that when the hydraulic transmission is operated as a fluid torque converter, the torque amplifying gearing is in series therewith, and when operated as a fluid coupling, the speed reduction between the driving and driven members of the transmission proper approaches a one-to-one ratio as the speed of the turbine or rotor approaches that of the impeller wheel or wheels.

While the invention has been described as applied to a power transmission especially adapted for use in a motor-driven vehicle, it is to be understood that the transmission may be otherwise employed and that the embodiment of the invention in a power transmission especially adapted for use in motor-driven vehicles is merely illustrative of one modification and application of the invention. The preferred embodiment of the invention has also been described with considerable detail, but I do not wish to be limited to the particular construction shown, which may be varied within the scope of the invention, and it is my intention to hereby cover all adaptations, modifications, arrangements and uses thereof which come within the practice of those skilled in the art to which the invention relates.

Having thus described my invention, I claim:

1. A power transmission device comprising an impeller wheel including a series of vanes, a turbine wheel including a series of vanes, a third vane wheel, means adapted to connect said impeller wheel with a driving means, means for operatively connecting said turbine wheel with a driven member, means for preventing reverse rotation of said third vane wheel, and means including mechanism controlled by the driven member for operatively connecting and disconnecting said third vane wheel with said impeller wheel.

2. A power transmission device comprising an impeller wheel comprising a series of vanes, a turbine wheel comprising a series of vanes, a third vane wheel, means adapted to connect said impeller wheel with a driving means, means for operatively connecting said turbine wheel with a driven shaft, an overrunning clutch means for preventing reverse rotation of said third vane wheel, and means including a selective type overrunning clutch for operatively connecting said third vane wheel with said impeller wheel.

3. A power transmission device comprising a driven member, an impeller wheel comprising a series of vanes, a turbine wheel comprising a series of vanes, a third vane wheel, a planetary gear train, means for operatively connecting said impeller wheel to a driving means, means for operatively connecting said turbine wheel with one of the elements of said planetary gear train, means for connecting another of the elements of said planetary gear train with said driven shaft, means for preventing reverse rotation of said third vane wheel, means for preventing reverse rotation of the third element of said planetary gear train, and means for operatively connecting and disconnecting said third vane wheel with said impeller wheel which said transmission is operating.

4. A power transmission device comprising a driven shaft, an impeller wheel comprising a series of vanes, a turbine wheel comprising a series of vanes, a third vane wheel, a planetary gear train comprising orbit and sun and planet gears, means for connecting said impeller wheel to a driving means, means for operatively connecting said turbine wheel with the orbit gear of said planetary gear train, means for operatively connecting the planet gears of said planetary gear train with said driven shaft, means for preventing reverse rotation of said third vane wheel, means for preventing reverse rotation of the sun gear of said planetary gear train, and means for operatively connecting and disconnecting said third vane wheel with said impeller wheel.

5. A power transmission device comprising a driven shaft, an impeller wheel comprising a series of vanes, a turbine wheel comprising a series of vanes, a third vane wheel, a planetary gear train comprising orbit and sun and planet gears, means for connecting said impeller wheel to a driving means, means for operatively connecting said turbine wheel with the orbit gear of said planetary gear train, means for connecting the planet gears of said planetary gear train with said driven shaft, means for preventing reverse rotation of said third vane wheel, means for preventing reverse rotation of the sun gear of said planetary gear train, and means for operatively connecting and disconnecting said third vane wheel and the sun gear of said planetary gear train with said impeller wheel.

6. A power transmission device comprising a driven shaft, an impeller wheel comprising a series of vanes, a turbine wheel comprising a series of vanes, a third vane wheel, a planetary gear train comprising orbit and sun and planet gears, means for connecting said impeller wheel to a driving means, means for operatively connecting said turbine wheel with the orbit gear of said planetary gear train, means for connecting the planet gears of said planetary gear train with said driven shaft, means including a hollow shaft for rotatably supporting said sun gear, means including a one way driving clutch for rotatably supporting said third vane wheel on said hollow shaft, means for preventing reverse rotation of said hollow shaft, and means for operatively connecting said hollow shaft with said impeller wheel.

7. A power transmission device comprising an impeller wheel including a series of vanes, a turbine wheel including a series of vanes, a third vane wheel, means adapted to connect said impeller wheel with a driving means, means for operatively connecting said turbine wheel with a driven member, means for preventing reverse rotation of said third vane wheel, means controlled by the driven shaft for operatively connecting and disconnecting said third vane wheel with said impeller wheel, and means for preventing the actuation of said last-mentioned means while the driving member is driving the driven member.

8. A power transmission device comprising a driving member, a driven member, an impeller wheel comprising a plurality of series of vanes, means for operatively connecting said impeller wheel with said driving member, a turbine wheel comprising a series of vanes interposed between said series of vanes of said impeller wheel, means for operatively connecting said turbine wheel with said driven member, and a normally inoperative one-way driving means operatively connecting said turbine wheel and the driving member.

9. A power transmission device comprising a driving member, a driven member, an impeller wheel comprising a series of vanes, a turbine wheel comprising a series of vanes, a planetary gear train, means for operatively connecting said impeller wheel to said driving member, means for operatively connecting said turbine wheel with one of the elements of said planetary gear train, and an overrunning clutch interposed between said driving member and said turbine wheel.

10. A power transmission device of the character described comprising a driving member, a driven member, an intermediate member, means including a fluid transmission of the vane-wheel type for operatively connecting said driving member and said intermediate member, means for operatively connecting said intermediate member and said driven member including a speed change transmission comprising a slidable member, means for moving said slidable member, and means for preventing the movement of said slidable member while said driven member is rotating.

11. A power transmission device comprising a driving member, a driven member, an impeller wheel comprising a series of vanes, a turbine wheel comprising a series of vanes, a third vane wheel comprising a series of vanes adapted to serve as reaction vanes, means for operatively connecting said impeller wheel with said driving member, means for operatively connecting said turbine wheel with said driven member, means for preventing rotation of said third vane wheel in a direction opposite to said impeller wheel, and means operable on said driven member reaching a predetermined speed adapted to mechanically connect said third vane wheel with said driving member whereby it acts as an impeller.

12. A power transmission device comprising a driving member, a driven member, an impeller wheel comprising a series of vanes, a turbine wheel comprising a series of vanes, a third vane wheel, means for operatively connecting said impeller wheel with said driving member, means for operatively connecting said turbine wheel with said driven member, means for operatively connecting said third vane wheel with said driving member, and means operable on said driven member reaching a predetermined speed adapted to disconnect said third vane wheel with said member.

13. A power transmisison device comprising a driving member, a driven member, an impeller wheel comprising a series of vanes, a turbine wheel comprising a series of vanes, a third vane wheel, means for operatively connecting said impeller wheel with said driving member, means for operatively connecting said turbine wheel with said driven member, means operable on said driven member reaching a predetermined speed adapted to operatively connect said third vane wheel with one of said members, and means for selecting the speed of said driven member at which said last-mentioned means becomes operative.

14. A power transmission device comprising a driving member, a driven member, an impeller wheel comprising a series of vanes, a turbine wheel comprising a series of vanes, a third vane wheel, means for operatively connecting said impeller wheel with said driving member, means for operatively connecting said turbine wheel with said driven member, means for operatively connecting said third vane wheel with said driven member, means operable on said driven member reaching a predetermined speed adapted to connect said third vane wheel with said driving member, and means for selecting the speed of said driven member at which said last-mentioned means becomes operative.

15. A power transmission device of the character described comprising a driving member, a driven member, an impeller wheel comprising a series of vanes, a turbine wheel comprising a series of vanes, a planetary gear train, means for operatively connecting said impeller wheel to said driving member, means for operatively connecting said turbine wheel with one of the elements of said planetary gear train, means for operatively connecting another of the elements of said planetary gear train with said driven member, an overrunning clutch for preventing reverse rotation of the third element of said planetary gear train, an overrunning clutch for operatively connecting said turbine wheel with said driving member, and means for selectively preventing rotation of the third element of said planetary gear train relative to the driving member.

16. A power transmission device comprising a driving member, a driven member, an impeller wheel comprising a series of vanes, a planetary gear train comprising orbit and sun and planet gears, means for operatively connecting said impeller wheel to said driving member, means for operatively connecting said turbine wheel with said orbit gear of said planetary gear train, means for connecting the planet gears of said planetary gear train with said driven member, an overrunning clutch for preventing reverse rotation of the sun gear of said planetary gear train, means including an overrunning clutch for operatively connecting said driving member and said orbit gear of said planetary gear train, and means for selectively preventing rotation of said sun gear with respect to said driving member in either direction.

17. A power transmission device comprising a driving member, a driven member, an impeller wheel comprising a series of vanes, a turbine wheel comprising a series of vanes, a third vane wheel of substantially the same diameter as said impeller wheel, said third vane wheel comprising a series of vanes adapted to act as reaction vanes, means for operatively connecting said impeller wheel with said driving member, means for operatively connecting said turbine wheel with a driven member, means for preventing rotation of said third vane wheel in a direction opposite that of said impeller wheel, and means for operatively connecting and disconnecting said third vane wheel mechanically with said driving member while said transmission is operating.

18. A motor-driven vehicle comprising drive wheels, a driving member, a driven member, an impeller wheel comprising a series of vanes, a turbine wheel comprising a series of vanes, a third vane wheel, means for operatively connecting said impeller wheel with said driving member, means for operatively connecting said turbine wheel with a driven member, means for operatively connecting said driven member with said drive wheels, means operable on the vehicle reaching a predetermined speed adapted to operatively connect said third vane wheel with said driving member, and means accessible to the operator for selecting the speed of the vehicle at which said last-mentioned means becomes operative.

19. A power transmission device comprising a driven member, an impeller wheel comprising a series of vanes, a turbine wheel comprising a series of vanes, a third vane wheel, a planetary gear train, means for operatively connecting said impeller wheel to a driving means, means for operatively connecting said turbine wheel with one of the elements of said planetary gear train, means for connecting another of the elements of said planetary gear train with said driven shaft, means for preventing reverse rotation of said third vane wheel, means for preventing reverse rotation of the third element of said planetary gear train, and means for operatively connecting said third vane wheel and said third element of said planetary gear train with said impeller wheel.

20. A motor-driven vehicle comprising drive wheels, an internal combustion engine, a power transmission device interposed between said drive wheels and said engine, said power transmisssion device including an impeller wheel comprising a series of vanes and operatively connected to said engine, a turbine wheel, means including a driven shaft for operatively connecting said turbine wheel with said drive wheels, and means including a mechanism controlled in accordance with the rotation of said driven shaft for applying a frictional drag to said driven shaft when the same is at or substantially at rest.

21. A motor-driven vehicle comprising an internal combustion engine, means for manually controlling the supply of fuel to said engine, drive wheels, a power transmission device interposed between said engine and said drive wheels, said power transmission device including an impeller wheel comprising a series of vanes and operatively connected to said engine, a turbine wheel, means including a driven shaft for operatively connecting said turbine wheel with said drive wheels, and means including mechanism controlled in accordance with the first-named means for selectively applying a frictional drag to said driven shaft.

22. A motor-driven vehicle comprising an internal combustion engine, means for manually controlling the supply of fuel to said engine, drive wheels, a power transmission device interposed between said engine and said drive wheels, said power transmission device including an impeller wheel comprising a series of vanes and operatively connected to said engine, a turbine wheel, means including a driven shaft for operatively connecting said turbine wheel with said drive wheels, and means including mechanism controlled in accordance with the first-named means and in accordance with the rotation of said driven shaft for applying a frictional drag to said driven shaft.

23. A power transmitting device comprising a driving member, a driven member, an impeller wheel including a series of vanes, a turbine wheel including a series of vanes, a third vane wheel including a series of vanes adapted to act as reaction vanes, means for operatively connecting said impeller wheel with said driving member, means for operatively connecting said turbine wheel with said driven member, means for preventing rotation of said third vane wheel in a direction opposite to the direction of rotation of said turbine wheel, and means including mechanism responsive to the speed of said driven member for operatively connecting and disconnecting said third vane wheel mechanically with said driving member.

24. A power transmitting device comprising a driving member, a driven member, an impeller wheel including a series of vanes, a turbine wheel including a series of vanes, a third vane wheel including a series of vanes adapted to act as reaction vanes, means for operatively connecting said impeller wheel with said driving member, means for operatively connecting said turbine wheel with said driven member, means for preventing rotation of said third vane wheel in a direction opposite to the direction of rotation of said turbine wheel, means including mechanism responsive to the speed of one of said members for operatively connecting and disconnecting said third vane wheel mechanically with one of said members, and manually controlled means for controlling the operation of said last named means.

25. A power transmitting device comprising a driving member, a driven member, an impeller wheel including a series of vanes, a turbine wheel including a series of vanes, a third vane wheel including a series of vanes adapted to act as reaction vanes, means for operatively connecting said impeller wheel with said driving member, means for operatively connecting said turbine wheel with said driven member, means for preventing rotation of said third vane wheel in a direction opposite to the direction of rotation of said turbine wheel, means including mechanism responsive to the speed of said driven member for operatively connecting and disconnecting said third vane wheel mechanically with said driving member, and manually controlled means for controlling the operation of said last named means.

26. A power transmitting device comprising a driving member, a driven member, an impeller wheel including a series of vanes, a turbine wheel including a series of vanes, a third vane wheel including a series of vanes adapted to act as reaction vanes, means for operatively connecting said impeller wheel with said driving member, means for operatively connecting said turbine wheel with said driven member, means for preventing rotation of said third vane wheel in a direction opposite to the direction of rotation of said turbine wheel, means including mechanism responsive to the speed of said driven member for operatively connecting and disconnecting said third vane wheel mechanically with said driving member, and manually controlled means for varying the speed of the driven member at which said last named means operates.

27. A power transmitting device comprising a driving member, a driven member, an impeller wheel including a series of vanes, a turbine wheel including a series of vanes, a third vane wheel, means for operatively connecting said impeller wheel with said driving member, means for operatively connecting said turbine wheel with said driven member, means for preventing rotation of said third vane wheel in a direction opposite to the direction of rotation of said turbine wheel, means including mechanism responsive to the speed of said driven member for operatively connecting and disconnecting said third vane wheel with said driving member, means for preventing the operation of said last named means while power is being transmitted from said driving member to said driven member, and means for causing a reversal of torque between said driving and driven members.

28. A power transmitting device comprising a driving member, a driven member, an impeller wheel including a series of vanes, a turbine wheel including a series of vanes, a third vane wheel, means for operatively connecting said impeller wheel with said driving member, means for operatively connecting said turbine wheel with said driven member, means for preventing rotation of said third vane wheel in a direction opposite to the direction of rotation of said turbine wheel, means including mechanism responsive to the speed of said driven member for operatively connecting and disconnecting said third vane wheel with said driving member, means for preventing the operation of said last named means while power is being transmitted from said driving member to said driven member, and manually controlled means for causing a reversal of torque between said driving and driven members.

29. In combination, a driving device, a driven device, a variable speed power transmission mechanism of the vane type comprising an impeller rotor having a series of vanes, a turbine rotor having a series of vanes, a third rotor having a series of vanes adapted to serve as reaction vanes, said impeller rotor being operatively connected with said driving device, said turbine rotor being operatively connected with said driven device, means for preventing rotation of said third rotor in a direction opposite to that of said impeller rotor, and means including mechanism controlled by one of said devices for operatively connecting said third rotor mechanically with said driving device temporarily in which event it acts as an impeller.

30. In combination, a driving device, a driven device, a variable speed power transmission mechanism of the vane type comprising an impeller rotor having a series of vanes, a turbine rotor having a series of vanes, a third rotor having a series of vanes adapted to serve as reaction vanes, said impeller rotor being operatively connected with said driving device, said turbine rotor being operatively connected with said driven device, means for preventing rotation of said third rotor in a direction opposite to that of said impeller rotor, means including mechanism controlled by one of said devices for operatively connecting said third rotor mechanically with said driving device in which event it acts as an impeller, and means for disconnecting said third rotor from said driving device.

31. In combination, a driving device, a driven device, a variable speed power transmission mechanism of the vane type comprising an impeller rotor having a series of vanes, a turbine rotor having a series of vanes, a third rotor having a series of vanes adapted to serve as reaction vanes, said impeller rotor being operatively connected with said driving device, said turbine rotor being operatively connected with said driven device, means for preventing rotation of said third rotor in a direction opposite to that of said impeller rotor, means for operatively connecting said third rotor mechanically with said driving device in which event it acts as an impeller, and means including mechanism controlled by one of said devices for disconnecting said third rotor from said driving device.

32. In combination, a driving device, a driven device, a variable speed power transmission mechanism of the vane type comprising an impeller rotor having a series of vanes, a turbine rotor having a plurality of radially spaced series of vanes, a third rotor having a series of vanes adapted to serve as reaction vanes, said impeller rotor being operatively connected with said driving device, said turbine rotor being located between said impeller rotor and said third rotor and being operatively connected with said driven device, means for preventing rotation of said third rotor in a direction opposite to that of said impeller rotor, and means for operatively connecting said third rotor mechanically with said driving device temporarily in which event it acts as an impeller.

33. In combination, a driving device, a driven device, a variable speed power transmission mechanism of the vane type comprising an impeller rotor having a series of vanes, a turbine rotor having a plurality of radially spaced series of vanes, a third rotor having a series of vanes adapted to serve as reaction vanes, said impeller and turbine and third rotors being of substantially the same diameter, said impeller rotor being operatively connected with said driving device, said turbine rotor being located between said impeller and third rotors and being operatively connected with said driven device, means for preventing rotation of said third rotor in a direction opposite to that of said impeller rotor, and means for operatively connecting said third rotor mechanically with said driving device temporarily in which event it acts as an impeller.

34. In combination, a driving device, a driven device, a variable speed power transmission mechanism of the vane type comprising an impeller rotor having a series of vanes, a turbine rotor having a plurality of radially spaced series of vanes, a third rotor having a series of vanes adapted to serve as reaction vanes, said impeller rotor being operatively connected with said driving device, said turbine rotor being located between said impeller rotor and said third rotor and being operatively connected with said driven device, means for preventing rotation of said third rotor in a direction opposite to that of said impeller rotor, and means including mechanism controlled by one of said devices for operatively connecting said third rotor mechanically with said driving device temporarily in which event it acts as an impeller.

35. In combination, a driving device, a driven device, a variable speed power transmission mechanism of the vane type comprising an impeller rotor having a series of vanes, a turbine rotor having a plurality of radially spaced series of vanes, a third rotor having a series of vanes adapted to serve as reaction vanes, said impeller and turbine and third rotors being of substantially the same diameter, said impeller rotor being operatively connected with said driving device, said turbine rotor being located between said impeller and third rotors and being operatively connected with said driven device, means for preventing rotation of said third rotor in a direction opposite to that of said impelled rotor, and means including mechanism controlled by one of said devices for operatively connecting said third rotor mechanically with said driving device temporarily in which event it acts as an impeller.

36. In combination, a driving device, a driven device, a variable speed power transmission mechanism of the vane type comprising an impeller rotor having an annular groove semi-circular in cross-section opening axially, a series of vanes in said groove in said impeller rotor adapted to act as impeller vanes, a turbine rotor having a plurality of axially spaced series of vanes, a third rotor having an annular groove semi-circular in cross-section substantially equal in size to said annular groove in said impeller rotor and facing the same, a series of vanes in said groove in said third rotor adapted to serve as reaction vanes, said impeller rotor being operatively connected with said driving device, said turbine rotor being operatively connected with said driven device, means for preventing rotation of said third rotor in a direction opposite to that of said impeller rotor, and means for operatively connecting said third rotor mechanically with said driving device temporarily in which event it acts as an impeller.

37. In combination, a driving device, a driven device, a variable speed power transmission mechanism of the vane type comprising an impeller rotor having an annular groove semi-circular in cross-section opening axially, a series of vanes in said groove in said impeller rotor adapted to act as impeller vanes, a turbine rotor having a plurality of axially spaced series of vanes, a third rotor having an annular groove semi-circular in cross-section substantially equal in size to said annular groove in said impeller rotor and facing the same, a series of vanes in said groove in said third rotor adapted to serve as reaction vanes, said impeller rotor being operatively connected with said driving device, said turbine rotor being operatively connected with said driven device, means for preventing rotation of said third rotor in a direction opposite to that of said impeller rotor, and means including mechanism controlled by one of said members for operatively connecting said third rotor mechanically with said driving device temporarily in which event it acts as an impeller.

38. In combination, a driving device, a driven device, a variable speed power transmission mechanism of the vane type comprising an impeller rotor having a series of vanes, a turbine rotor having a series of vanes, a third rotor having a series of vanes adapted to serve as reaction vanes, said impeller rotor being operatively connected with said driving device, said turbine rotor being operatively connected with said driven device, means for preventing rotation of said third rotor in a direction opposite to that of said impeller rotor, means for operatively connecting said third rotor mechanically with said driving device temporarily in which event it acts as an impeller, means including a one-way driving mechanism mechanically connected to said driving device and said driven device for driving said driving device from said driven device.

39. In combination, a driving device, a driven device, a variable speed power transmission mechanism of the vane type comprising an impeller rotor having a series of vanes, a turbine rotor having a series of vanes, a third rotor having a series of vanes adapted to serve as reaction vanes, said impeller rotor being operatively connected with said driving device, said turbine rotor being operatively connected with said driven device, means for preventing rotation of said third rotor in a direction opposite to that of said impeller rotor, means including mechanism controlled by one of said devices for operatively connecting said third rotor mechanically with said driving device temporarily in which event it acts as an impeller, means including a one-way driving mechanism mechanically connected to said driving device and said driven device for driving said driving device from said driven device.

ROBERT C. RUSSELL.